UNITED STATES PATENT OFFICE.

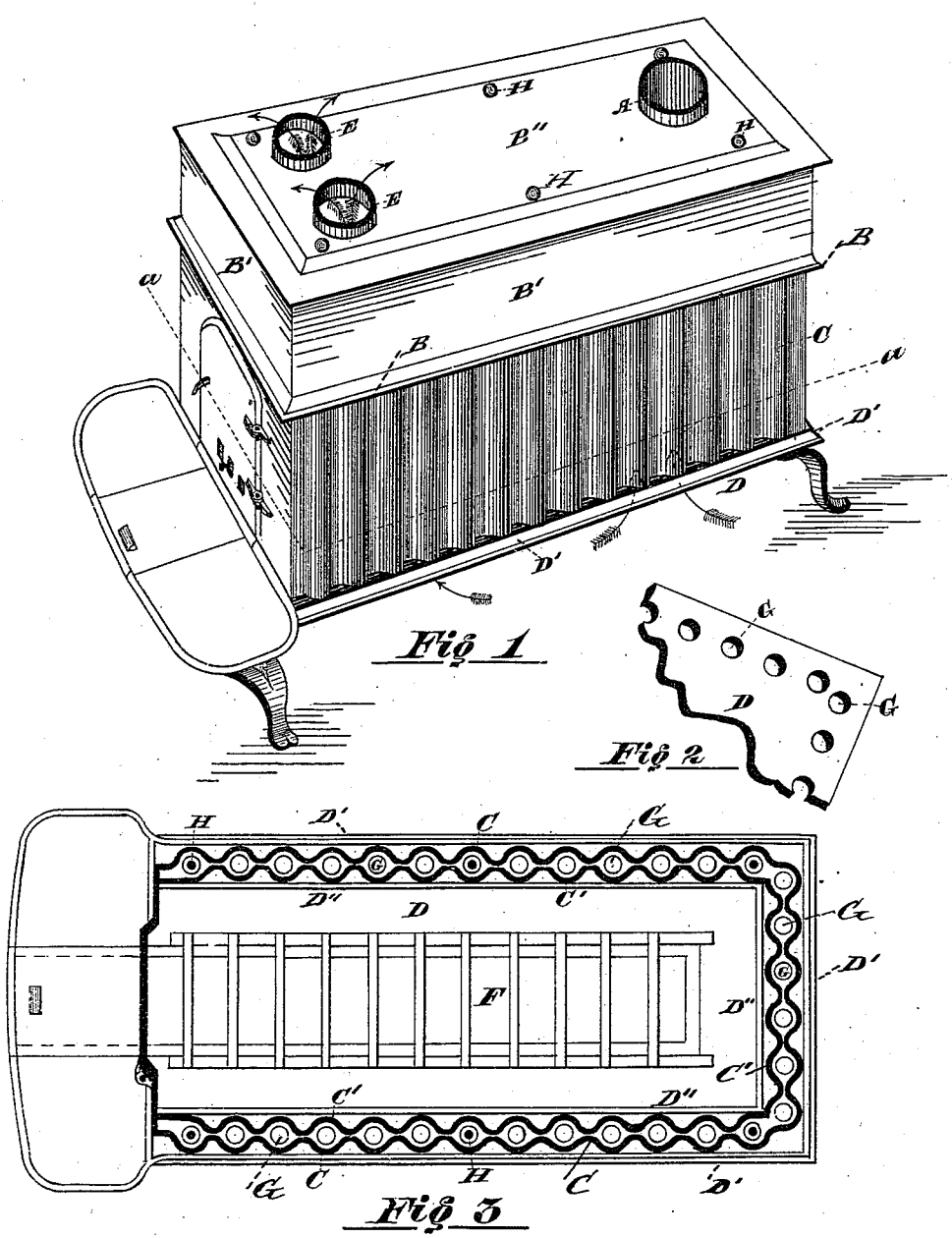

CHARLES H. McCAW AND THOMAS BROWN, OF PORT PERRY, ONTARIO, CANADA.

IMPROVEMENT IN HEATING-STOVES.

Specification forming part of Letters Patent No. 212,963, dated March 4, 1879; application filed April 11, 1878.

*To all whom it may concern:*

Be it known that we, THOMAS BROWN and CHARLES HENRY McCAW, both of the village of Port Perry, in the county of Ontario, in the Province of Ontario, in the Dominion of Canada, have jointly invented a new and useful Improvement in Stoves; and we do hereby declare that the following is a clear and exact description of the same, which will enable others skilled in the art to which it pertains to make and use the same, reference being had to the drawings hereto annexed, which form a part of this specification, and in which—

Figure 1 is a perspective view of a stove embodying our improvement. Fig. 2 is a perspective view of a portion of the bottom plate, seen from the under side; and Fig. 3 is a horizontal section taken on the line $a\,a$ in Fig. 1.

Similar letters of reference indicate corresponding parts in all the figures.

Our improvements relate to that class of stoves or heaters which are provided with air passages and chambers for heating the air as it passes through these, receiving cold air at the bottom, and discharging it hot at the top; and it consists in an improved construction and combination of parts, substantially as and for the purpose hereinafter more fully described.

In the drawings, D is the bottom plate, which is supported upon legs, as usual, and provided with a grate and ash-pit, F. Surrounding three sides of the bottom plate is a raised ledge or flange, D′, parallel to which is another flange, D″, forming a channel on plate D between the two flanges D′ and D″. This channel or recess is provided with a series of equidistant openings, G, as shown.

The outer wall of the stove is formed of a vertically-corrugated plate, C, inserted with its lower edge into the channel in plate D so as to impinge upon its outer flange, D′; and its inner wall is formed by a similar corrugated plate, C′, (but made, preferably, of heavier metal,) set into the channel so as to impinge upon its inner flange, D″. Plates C and C′ are so arranged relative to each other that the projecting parts or ribs of their corrugations shall nearly meet, as shown in Fig. 3, their sunken or depressed parts forming vertical tubes, which surround each one of the openings G in the bottom plate, D, these vertical tubes communicating with each other through the vertical narrow openings or slots formed between the meeting ribs of plates C C′.

The top edges of plates C C′ are covered by a plate, B, similar in its construction to the bottom plate, D, and provided, like this, with a surrounding double flange, into the channel formed by which the top edges of plates C C′ are inserted. Plate B has a series of perforations corresponding to the openings G in plate D, and is surrounded by four vertical plates, B′, covered by a top plate, B″, by which a rectangular heating-chamber is formed, provided with the air-outlets E E.

A is the smoke-flue, which extends vertically through plates B″ B, communicating with the fire-pot.

The horizontal parallel plates B″ B D are secured firmly together by rods or bolts H, provided each with a head on its upper and a nut on its lower end, which are inserted vertically through the vertical tubes formed by plates C C′ at suitable distances from each other.

By this construction and combination of parts, it will be observed that all the parts are held together simply by the rods H, so that they may be readily detached for cleaning, transportation, or for other purposes. The connecting-rods H, passing through the air-channels formed by plates C C′, are not in proximity to the fire, so that they will not become burned or warped out of shape by the heat.

Having thus described our improvement, we claim and desire to secure by Letters Patent of the United States—

The improved heater herein shown and described, composed of the perforated and double-flanged parallel horizontal plates D B, corrugated vertical plates C C′, inserted between the flanges of the plates D B, top plate, B″, having outlets E E, side plates, B′, and vertical connecting-rods H H, arranged within the vertical air-ducts formed by plates C C′, the whole constructed and combined substantially in the manner and for the purpose shown and set forth.

THOMAS BROWN.
CHARLES HENRY McCAW.

Witnesses:
   JOHN ADAM PLANK,
   JOHN TRICK.